United States Patent
Swan

(10) Patent No.: US 11,014,692 B2
(45) Date of Patent: May 25, 2021

(54) ELEVATED LOAD-BEARING PLATFORM

(71) Applicant: Philip Lawrence Swan, Redmond, WA (US)

(72) Inventor: Philip Lawrence Swan, Redmond, WA (US)

(73) Assignee: Philip L Swan, Redmond, WA (US)

( * ) Notice: Subject to any disclaimer, the term of this patent is extended or adjusted under 35 U.S.C. 154(b) by 718 days.

(21) Appl. No.: 15/241,081

(22) Filed: Aug. 19, 2016

(65) Prior Publication Data

US 2017/0050751 A1 Feb. 23, 2017

Related U.S. Application Data

(60) Provisional application No. 62/207,942, filed on Aug. 21, 2015.

(51) Int. Cl.
| | |
|---|---|
| *B64G 1/00* | (2006.01) |
| *B61B 13/08* | (2006.01) |
| *B64G 99/00* | (2009.01) |
| *B61B 3/02* | (2006.01) |

(52) U.S. Cl.
CPC ............... *B64G 1/002* (2013.01); *B61B 3/02* (2013.01); *B61B 13/08* (2013.01); *B64G 9/00* (2013.01)

(58) Field of Classification Search
CPC .... B64G 1/002; B64G 2005/005; B64G 5/00; B61B 3/00; B60V 3/08; B64C 2201/128; B64C 23/072
See application file for complete search history.

(56) References Cited

U.S. PATENT DOCUMENTS

| | | | | | |
|---|---|---|---|---|---|
| 3,664,268 | A | * | 5/1972 | Lucas | B61B 13/08 104/281 |
| 4,881,446 | A | * | 11/1989 | Marks | B64G 1/002 89/8 |
| 5,374,915 | A | * | 12/1994 | Steingroever | F16C 39/063 335/284 |
| 5,950,543 | A | * | 9/1999 | Oster | B61B 13/10 104/130.05 |
| 6,311,926 | B1 | * | 11/2001 | Powell | B64F 1/04 104/123 |
| 6,418,082 | B1 | * | 7/2002 | Hollis | G01S 3/8036 367/118 |
| 7,663,281 | B1 | * | 2/2010 | Nau | B61B 13/08 310/90.5 |

(Continued)

*Primary Examiner* — Christopher D Hutchens

(57) ABSTRACT

An apparatus is described for supporting payloads at high elevations with respect to a planetary body. The apparatus comprises a bearing that encircles a portion of a planetary body. One ring of the bearing rotates, and a coupling mechanism transfers centripetal forces to another non-rotating ring. Lift stays connect the non-rotating ring to the planetary body; and contribute a force that is in equilibrium with the centripetal and gravitational forces. A preferred embodiment is constructed and tested in the ocean and then raised to altitude. Its coupling mechanism employs magnetic forces and its lift stays are interwoven, partially supported and stabilized aeronautically, and anchored to the planet. The apparatus's elevation is not supported by transferring forces to the surface through the inertia of precision-guided high velocity components, thus these components are not necessarily exposed to seismic activity, weather, or anomalous air traffic.

17 Claims, 8 Drawing Sheets

(56) References Cited

U.S. PATENT DOCUMENTS

| | | | | |
|---|---|---|---|---|
| 9,325,220 | B2* | 4/2016 | Henderson | B60L 13/04 |
| 2010/0012771 | A1* | 1/2010 | Jess | B64B 1/36 |
| | | | | 244/29 |
| 2011/0011298 | A1* | 1/2011 | Timperman | B60V 3/04 |
| | | | | 104/91 |
| 2011/0042521 | A1* | 2/2011 | Sample | B64G 1/002 |
| | | | | 244/159.3 |
| 2014/0000473 | A1* | 1/2014 | Miller | B61C 11/06 |
| | | | | 104/138.1 |
| 2014/0306064 | A1* | 10/2014 | Palmer | B64G 1/402 |
| | | | | 244/171.1 |
| 2015/0120126 | A1* | 4/2015 | So | G01C 23/00 |
| | | | | 701/26 |
| 2015/0166165 | A1* | 6/2015 | Kelly | B64B 1/50 |
| | | | | 244/33 |
| 2015/0251561 | A1* | 9/2015 | Konigorski | B60L 13/04 |
| | | | | 244/100 R |
| 2016/0297548 | A1* | 10/2016 | Powell | B64G 1/002 |
| 2016/0355194 | A1* | 12/2016 | Suppes | B61B 3/00 |
| 2018/0186389 | A1* | 7/2018 | Hosseini | B60L 13/003 |
| 2020/0032844 | A1* | 1/2020 | Saito | H02K 7/085 |

* cited by examiner

ELEVATED LOAD-BEARING PLATFORM

CROSS REFERENCE

| U.S. Pat. No. | Apr. | 16. Jan. | Robert P. | Failure resistant |
|---|---|---|---|---|
| 22. 6,173,922 | 1997 | 2001 | Hoyt | multiline tether |

BACKGROUND OF THE INVENTION

These teachings relate generally to a structure for supporting facilities, such as habitable floor space, space vehicle launch and recovery systems, and related support systems, at altitudes that are higher than can typically be reached using compressive structures such as buildings and towers. These teachings also relate to methods for erecting and maintaining said structure.

Currently, altitudes above the limited reach of towers, buildings, and aircraft are accessed using systems based on rocket propelled vehicles. These systems generally employ a multitude of different sub-systems to complete a round trip journey. For example, launch gantries and multiple thruster stages will typically be used for achieving orbit. Variants sometimes substitute an early rocket stage with a stage that uses air breathing engines. Aero-braking systems, such as ablative shielding, various parachutes, as well as more rockets, wings, and landing gear may be used during a return journey.

Some components of these systems experience extensive wear during their use. In practice, component recovery and refurbishment can be costly—so costly in fact that abandoning used components and replacing them with new ones is often economical. Therefore, these systems tend to have high operational costs.

The vehicles used typically subject their passengers and payloads to significant stress, shake, and vibration. They are not considered to be as safe or as reliable as commercial terrestrial transportation systems.

Many people are surprised that the cost of an "everyday object", such as a pen or a toilet, is significantly inflated when that object is designed to be used in space. Rocket based systems tend to make the cost and weight of the payload itself higher. Payloads need to be engineered to be stronger to withstand the stresses of launch, and this can make them heavier or costlier. When the payload is a passenger, the passenger typically needs extensive training and medical examination. Because the aforementioned costs are high, the verification costs associated with preparing payloads is also high, as it would not be acceptable for the payload to reach its destination and then fail to operate properly—or die, in the case of living payload or a passenger.

Years of developmental effort and substantial funding have been invested into this field by the military, research administrations, and commercial enterprises of several economically successful countries. Many variations and improvements on rocket propelled vehicle concepts have been produced; however, despite all the investment and effort, the complexity of these systems remains high, and therefore the cost of using these systems remains high.

An advantage that rocket based systems do have over several large-scale fixed infrastructure concepts, such as space elevators, is that they generally have a low "non-recurring" or capital cost. This makes them a good choice for small volumes of passengers and cargo. Similarly, a ferry can be a better choice than a bridge when choosing the best transportation infrastructure for traversing a certain body of water, provided that the demand for convenient passage across that particular body of water is sufficiently small.

As demand for routine access to space grows, the analogy of "building a bridge" becomes more attractive. Several ideas for "bridges" that can help our civilization to migrate out into space have been incorporated into works of speculative fiction or cited in the prior art. Those that are known to the inventor include:
1) The Space Elevator
2) The Orbital Ring
3) The Space Fountain
4) The Launch Loop
5) Inflated Towers
6) Artificial Inflated Mountains Each of these ideas faces unique challenges if applied to service current and near-future demands of human civilization.

The Space Elevator concept is faced with at least some of the following challenges:
1) High capital cost, if the main tether is built with commercially available materials.
2) High cost to deploy the system using already established space access infrastructure, namely rockets.
3) Vulnerability to impactors (such as space debris) and possibly elemental oxygen.
4) The structure does not service a convenient destination for the purposes of space tourism—tourists would spend too much of their vacation time in transit.
5) During the journey to the destination (geosynchronous orbit) the elevator car is exposed to space radiation; therefore, shielding material would be needed to protect passengers and sensitive cargo. The weight of the shielding material would add to the energy cost of making a trip up the elevator.

The Orbital Ring concept is faced with at least some of the following challenges:
1) High capital cost of a minimally viable implementation. The main ring circumference is greater than the circumference of Earth. The ring must be massive and rigid enough to support the weight of at least one short space elevator without distorting because of the concentrated load. Note that as part of this concept, the small space elevator is attached to a magnetically levitated carriage that travels around the ring opposite to the direction of ring rotation. This allows the space elevator's tether to remain in a constant position over the surface of the planet.
2) High cost to deploy the system. All of the ring's components would need to be placed into orbit using our present space access infrastructure, namely rockets. Alternately, the structure would have a dependency on a non-existent infrastructure for mining materials and manufacturing components in space. Establishing that infrastructure would, in turn, be costly.
3) As a destination, it is a microgravity environment. This environment would be uncomfortable for many tourists to endure. Their visits would be short and thus a tourist industry would make less money. Workers supporting the industry would experience loss of muscle mass and reduced bone strength, and therefore they would need to be rotated out more frequently.
4) The ring is somewhat exposed to space debris.
5) The ring is somewhat exposed to space radiation.

The Space Fountain concept is faced with at least some of the following challenges:
1) It uses a high speed "mass stream" comprised of magnetically levitated and accelerated pellets which travel at high speed through an evacuated tube, making it a high-energy system. Energy is constantly being converted from potential energy to kinetic energy and back again in order to transfer static load forces from upper parts of the structure down to the surface of the planet. The constant conversion of energy from one form to another means that there is flow of energy. When energy flows, there are associated energy losses. For example, energy may be lost due to resistance in electrical wires, or inefficiencies in the magnetic systems that accelerate and decelerate the pellets. The lost energy will generate heat. Thermal dissipation systems will be needed to prevent overheating, and the structure will need to support their additional weight. The pellets themselves will convert energy into heat because eddy currents will be created within the pellets as they pass through magnetic fields of varying intensity during their journey through the evacuated tube. Therefore, ultimately, the operational cost of providing replacement energy to a space fountain may be quite high. This puts the technology into more direct competition with rockets, which also have high operational costs.
2) Portions of the precision-guided mass stream are exposed to a variety of terrestrial threats that could jar it or otherwise interfere with its smooth operation, leading to catastrophic failure. These threats include seismic events, lightning, strong winds, aberrant aircraft, small arms such as portable missiles, rocket propelled grenades, gun-fire. A catastrophic failure could cause the substantial energy of the mass stream to threaten nearby establishments. This would likely increase regulatory hurdles for securing approval to build the structure. Operational costs would also increase if a condition of approval were that it had to be constructed within a large secure zone that is enforced by a heavily patrolled perimeter.
3) As much of the system's cross-sectional area is exposed to wind shear, its top may sway. This could limit its utility for applications where stability is required.
4) The per square foot cost to buy or lease high-altitude floorspace at the top of a space fountain is expected to be very high. The floorspace would therefore not be a suitable for sustaining large static loads, such as the habitable facilities (restaurants, hotel rooms, entertainment venues, etc.) that typically are desired by tourists. Therefore, it is unlikely that the structure's capital and operational costs could be offset by leasing high-altitude floorspace to a tourist industry.
5) The top of a single space fountain is not well adapted, geometrically, to the problem of supporting a linear accelerator for accelerating space vehicles horizontally to orbital velocities.

The Launch Loop concept is faced with at least some of the following challenges:
1) See Space Fountain #1
2) See Space Fountain #2. Some proponents of this architecture recommend that it be deployed off-shore, and near the equator, where the weather is generally temperate. This would mitigate some kinds of terrestrial threats but also expose it to new threats. For example, it might be difficult to defend the underwater portions of the precision guided mass stream from a torpedo attack or prevent accidental collision with a submarine from ever occurring during the lifetime of the structure.
3) Some depictions of the Launch Loop in the literature suggest that the precision guided mass-stream component can withstand the point force loads, such as the point loads of the launched vehicles and the point loads of individual guy wires, which are widely spaced. This suggests that the precision guided mass-stream is designed to withstand these of point force loads, but how this is achieved does not appear to be adequately explained in the literature.
4) The procedure by which the structure is apparently erected adds complexity to the design. The precision guided mass-stream would experience more jostling and distortion during erection and startup than during steady state operation. The engineering challenge of maintaining vacuum along the considerable length of the structure is complicated by the need for expansion joints. These expansion joints would also add weight to the structure.

The Inflated Towers concept is faced with at least some of the following challenges:
1) It shares challenges 3, 4, and 5 with the Space Fountain, namely loss of stability due to exposure to wind shear, offering little useable floorspace at the top, and not being well adapted to the job of supporting a long linear accelerator for horizontally accelerating space vehicles up to orbital velocities.

The Artificial Inflated Mountains concept is faced with at least some of the following challenges:
1) Cost, including land cost and the cost of a staggeringly large number of individual building "blocks" that are needed to construct it.
2) Environmental impact, as the mountain would likely disrupt the natural habitat of everything underneath it. It would potentially interfere with migration. It could increase fuel costs for air traffic that had to route around it. And it could potentially affect the local climate.

SUMMARY OF THE INVENTION

This invention relates generally to mechanisms for supporting facilities at a distance from a planetary body, such as the planet Earth, and more specifically to supporting facilities at a high altitude above the surface, and if desired at a fixed position relative to the surface.

The facilities may include "plots" of habitable floor space that can be leased to help recoup costs, such as attractions, accommodations, and services for a tourist industry. Other facilities may serve space industries by winching passengers and cargo from the surface to a high altitude, and then accelerating them tangential to the planetary body to reduce the cost of orbital insertion.

The invention utilizes a precision guided mass stream to generate a useful lift force and this makes it an active structure; however, it has several critical advantages over other proposed active structures. First, the invention teaches how distortion and circuitous redirection of the mass stream may be reduced relative to prior art both during construction and during steady state operation, which in turn reduces the complexity and increases the reliability of the mass stream. Once erected, the invention allows the entire mass stream to be placed at an altitude where it is relatively defensible against both terrestrial threats and space threats. It can be positioned well above the reach of most weapons of war, commercial air traffic, weather, and seismic events yet still close enough to the planet to receive the protection that the residual atmosphere offers against space debris and meteorites.

The remaining atmosphere, planetary magnetic fields, and mass of the planet will help to shield inhabitants from exposure to solar and space radiation. The altitude of the structure can be selected and adjusted to optimize for more or less natural shielding versus other benefits, such as the quality of the views, the amount of air resistance experienced by accelerated vehicles, and overall cost and complexity.

Figure 1:
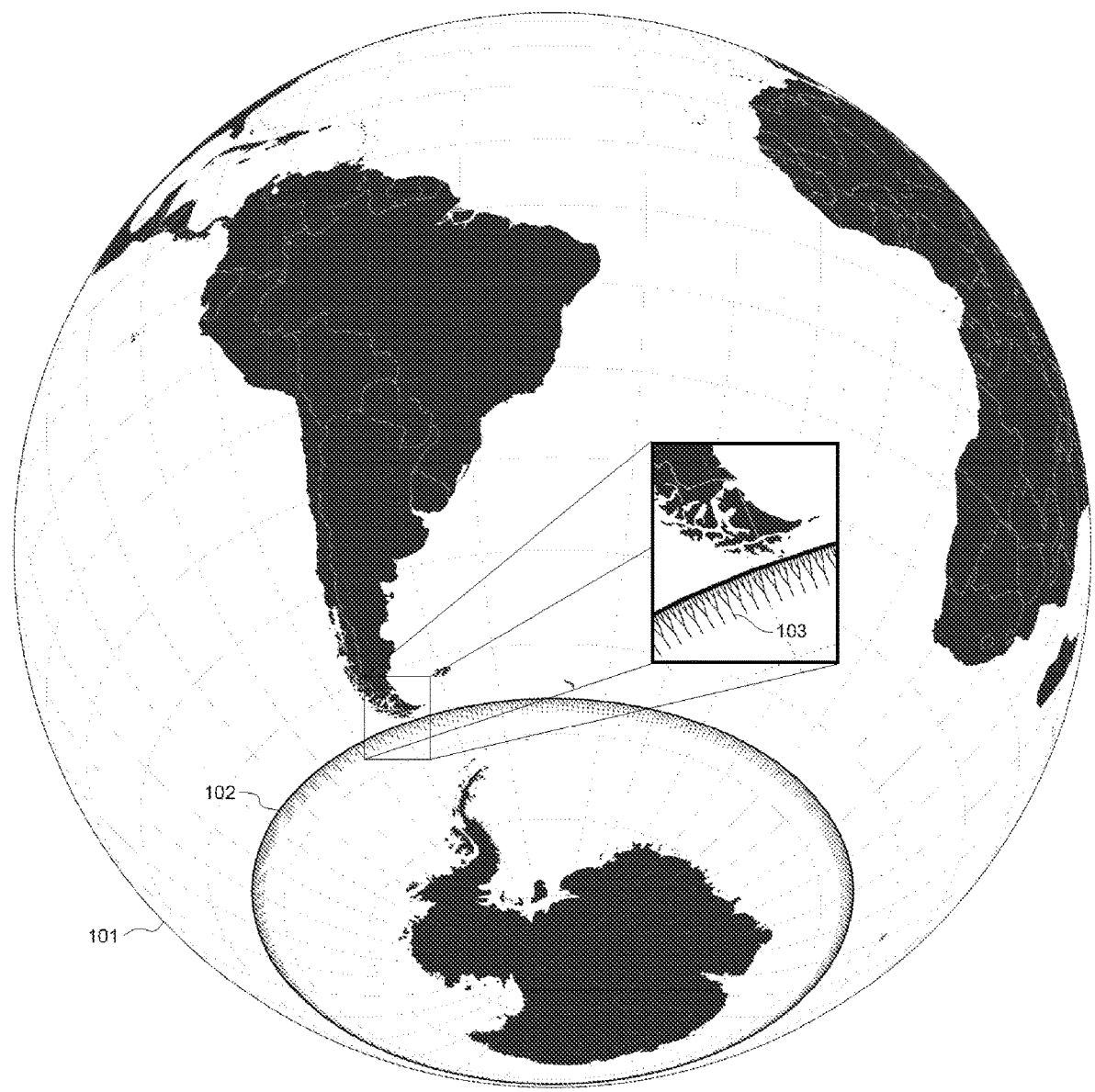
FIG. 1 is an orthographic projection of the planet Earth showing how the invention might be deployed such that it encircles the continent of Antarctica. The inset diagram shows a close-up of a section of the invention.
Figure 2A:
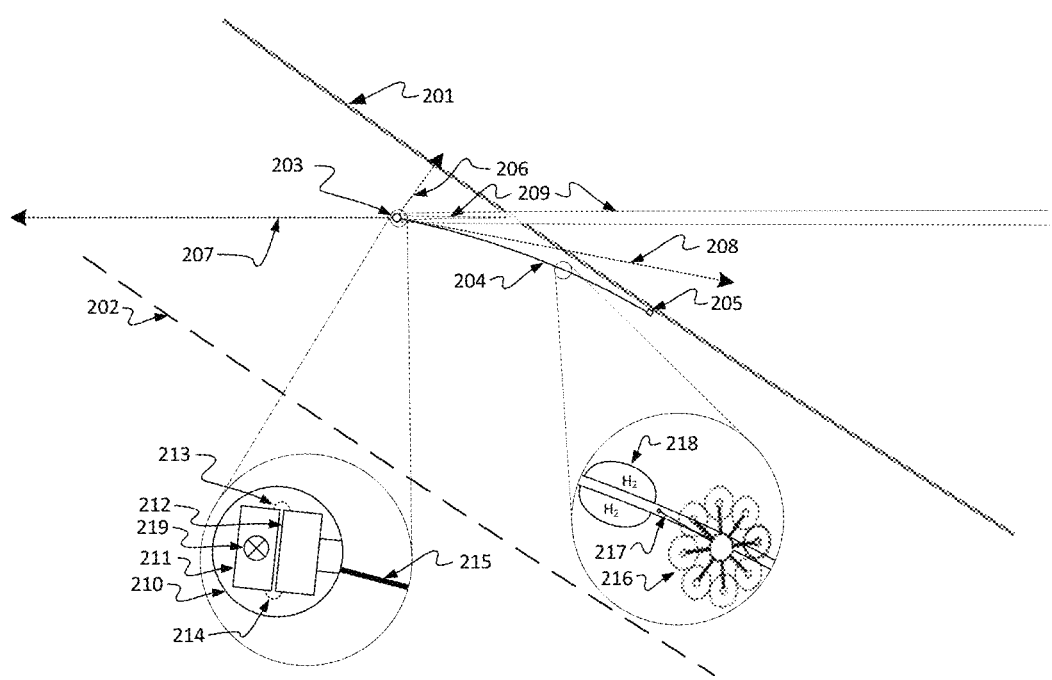
FIG. 2a and FIG. 2b are cut-a-way close-up views of a portion of the apparatus that show a portion of the lift stay supported high-speed electromagnetic bearing in proximity to a planet and details of the bearing's interior.

The FIG. 2a view shows a perspective where the planet 201 is seen side-on with its north pole at the top, the bearing is encircling Antarctica (as was depicted in FIG. 1), and the view is zoomed-in on the left side of the apparatus.

Figure 2B:
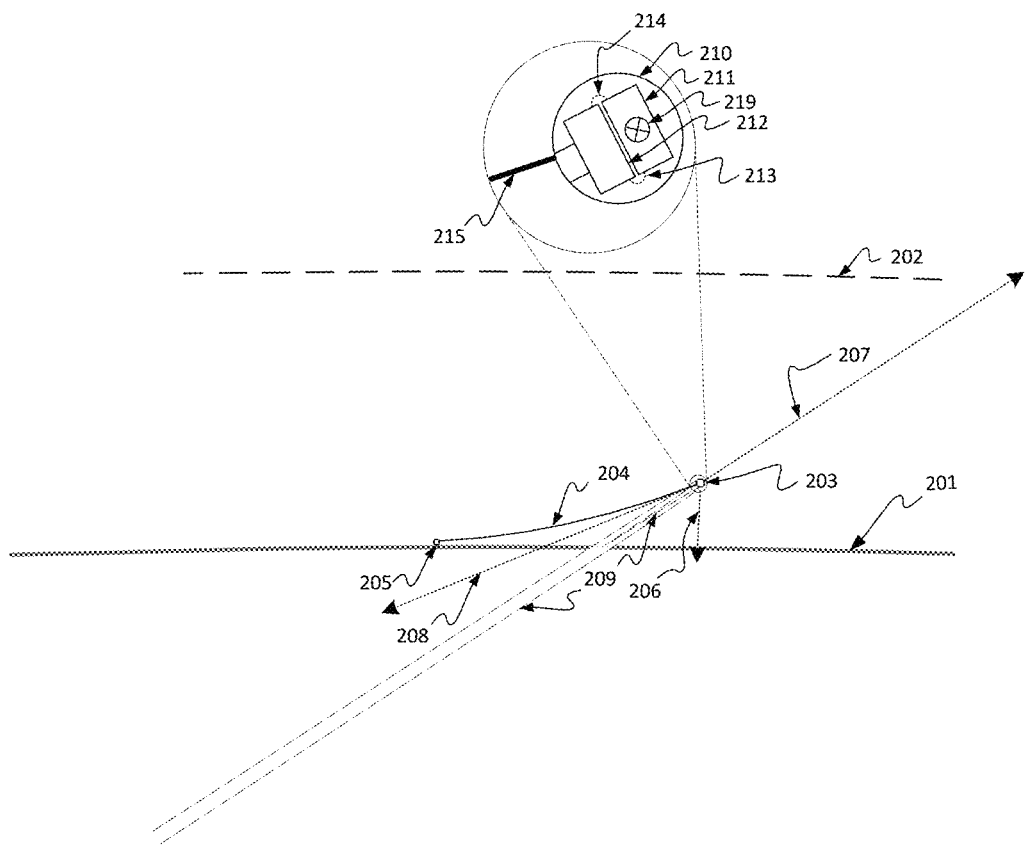

FIG. 2b is the same view as FIG. 2a but with the image is rotated clockwise by about 140°. In this view, the surface of the planet 201 is horizontal. The FIG. shows what the apparatus would look like from the point of view of an observer standing on the surface of the planet.

Figure 3:
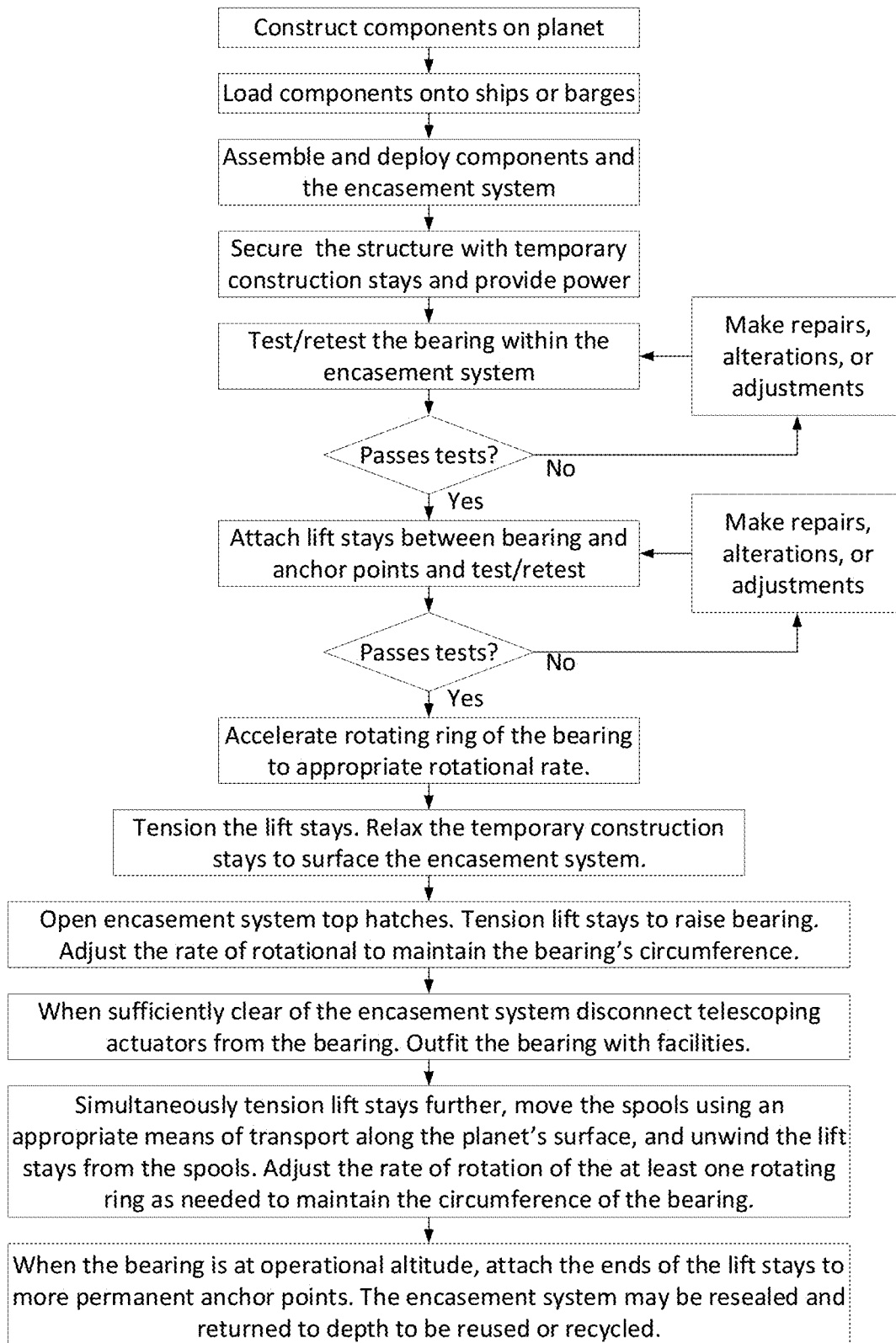

FIG. 3 is a flow chart showing phases of construction and deployment for a preferred embodiment.

Figure 4:
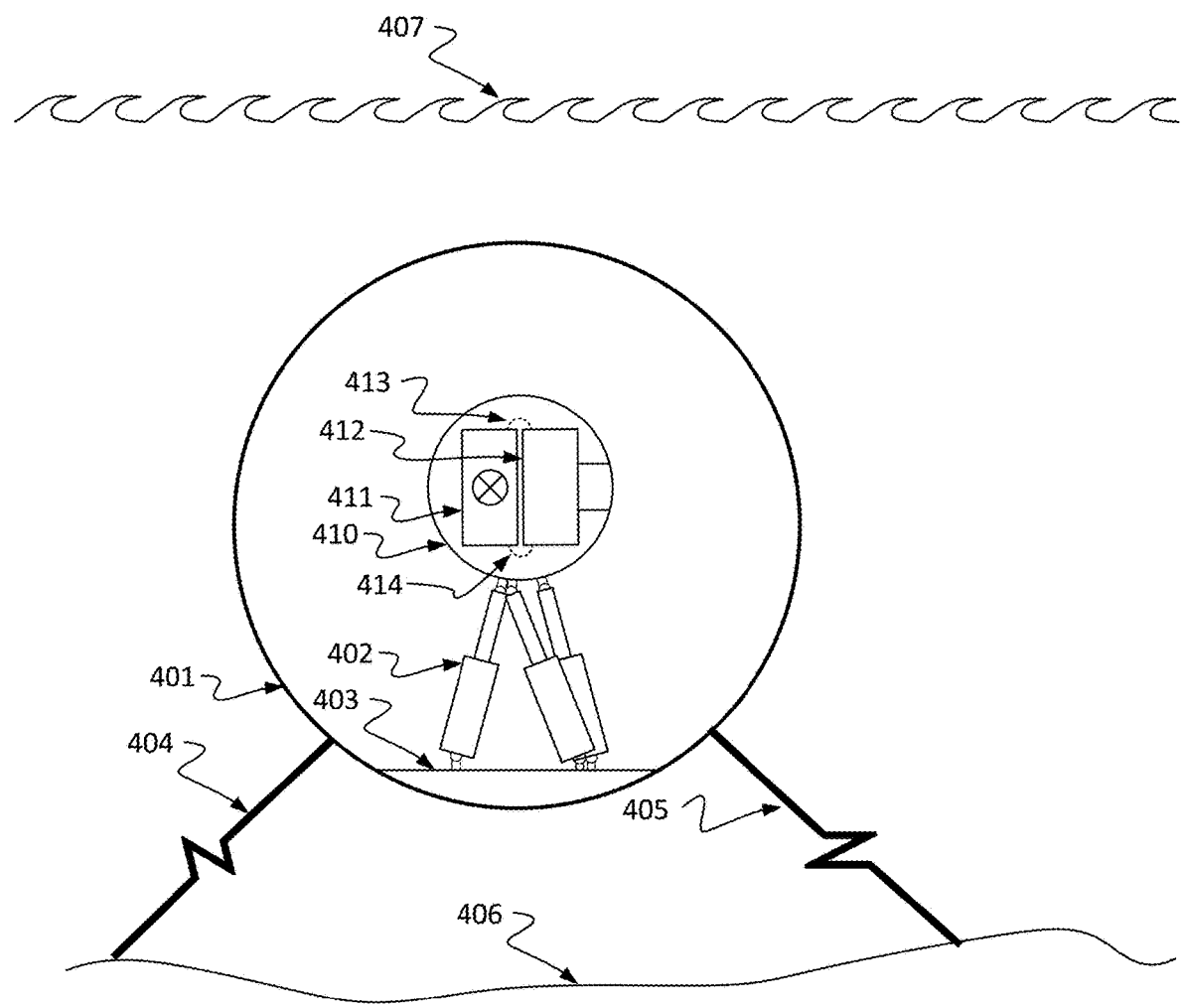

FIG. 4 is a cut-a-way view that depicts a preferred embodiment of the invention within an encasement system during early construction and testing.

Figure 5:
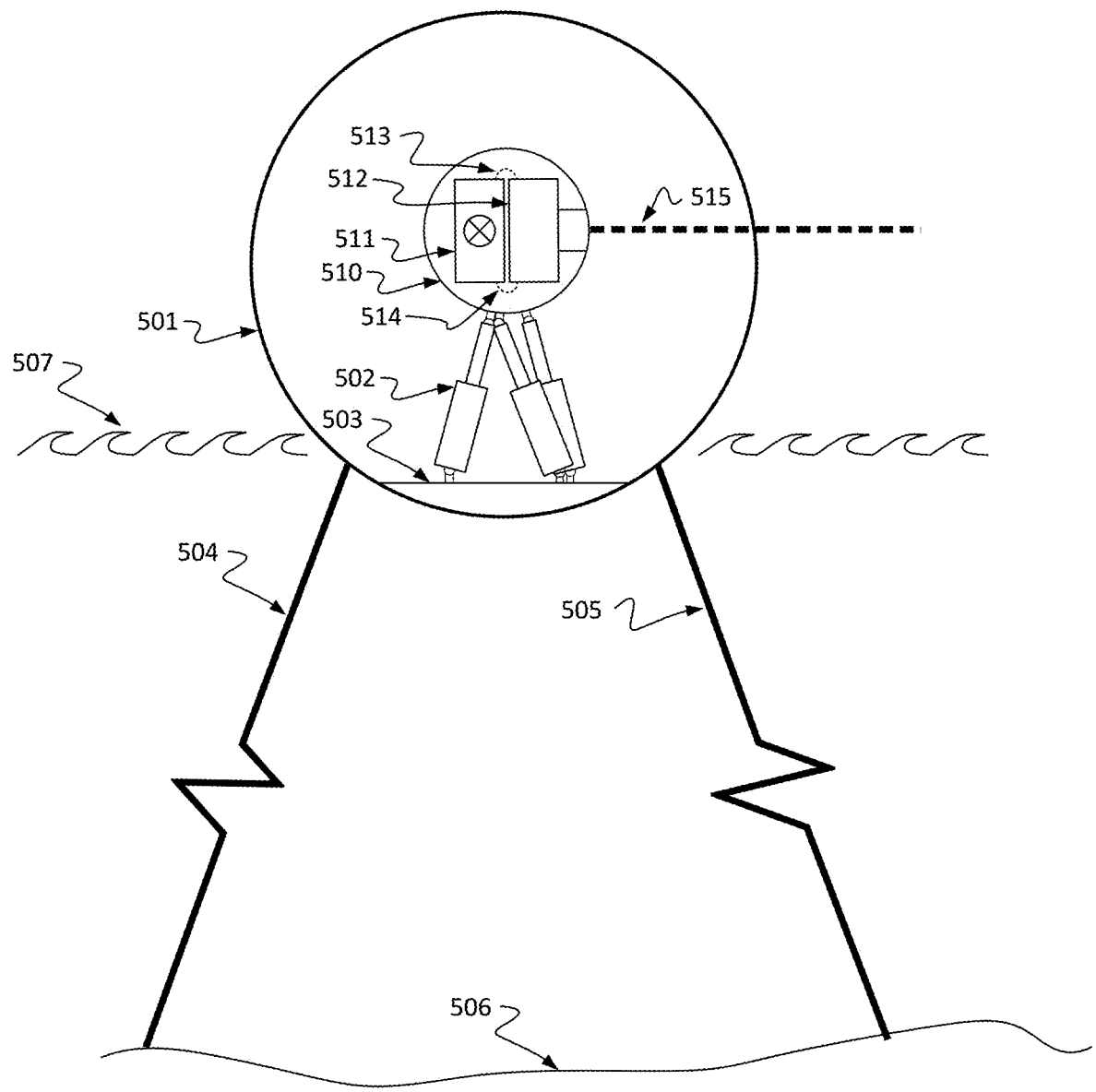

FIG. 5 is a cut-a-way view that depicts a preferred embodiment of the invention within an encasement system during later construction and testing.

Figure 6:
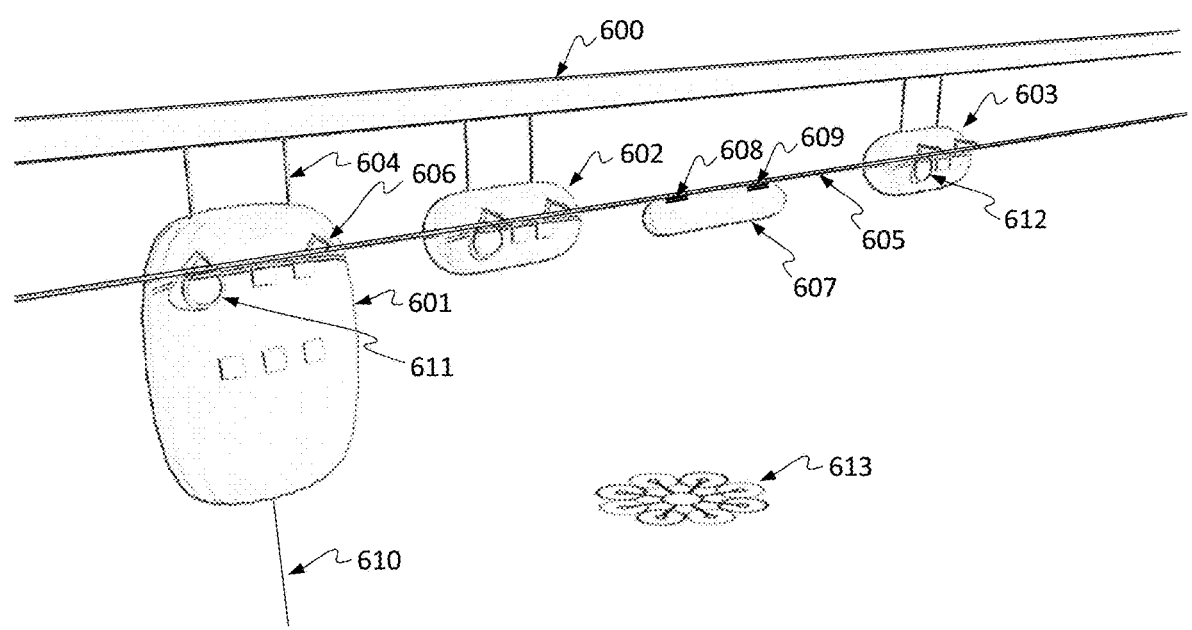

FIG. 6 is a perspective drawing that depicts a few facilities supported by a section of the bearing.

Figure 7:
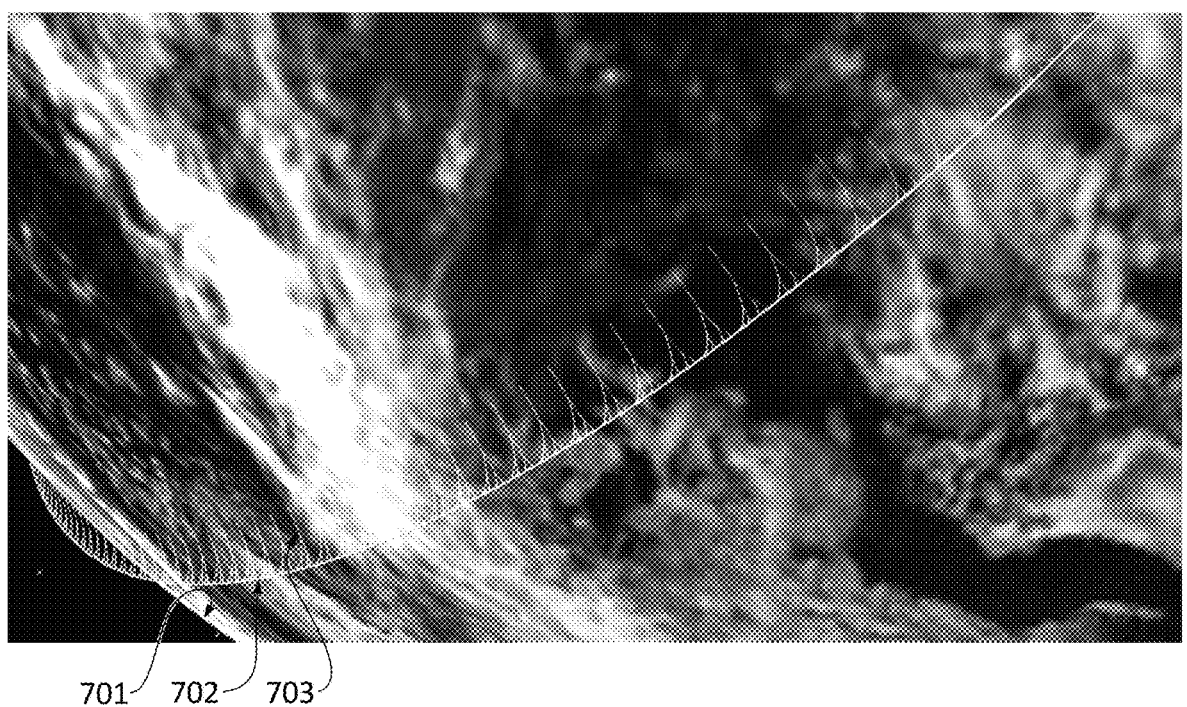

FIG. 7 is a three-dimensional rendering of the apparatus showing the bearing encircling the planet and being supported above the planet's surface by a plurality of forked lift stays.

Figure 8A:
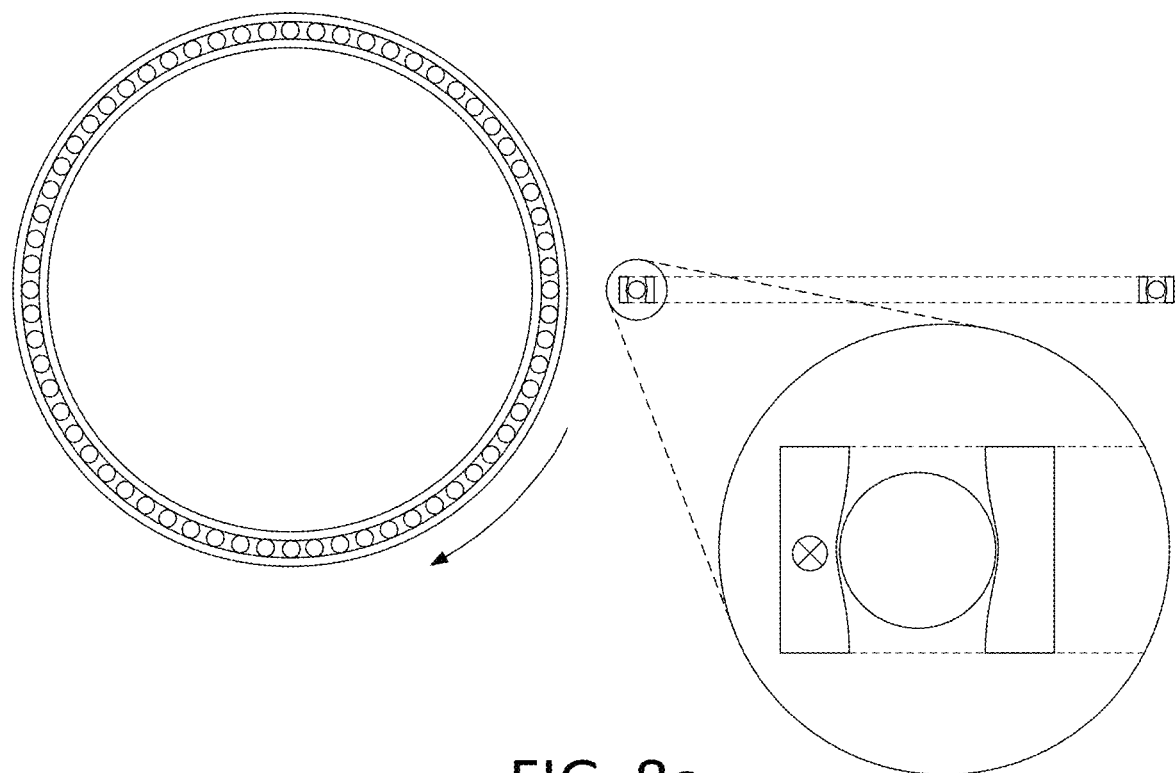

FIG. 8a is a top-view and a side-view of a standard ball bearing with an inset to show a close-up of the left side of the side-view.

Figure 8B:
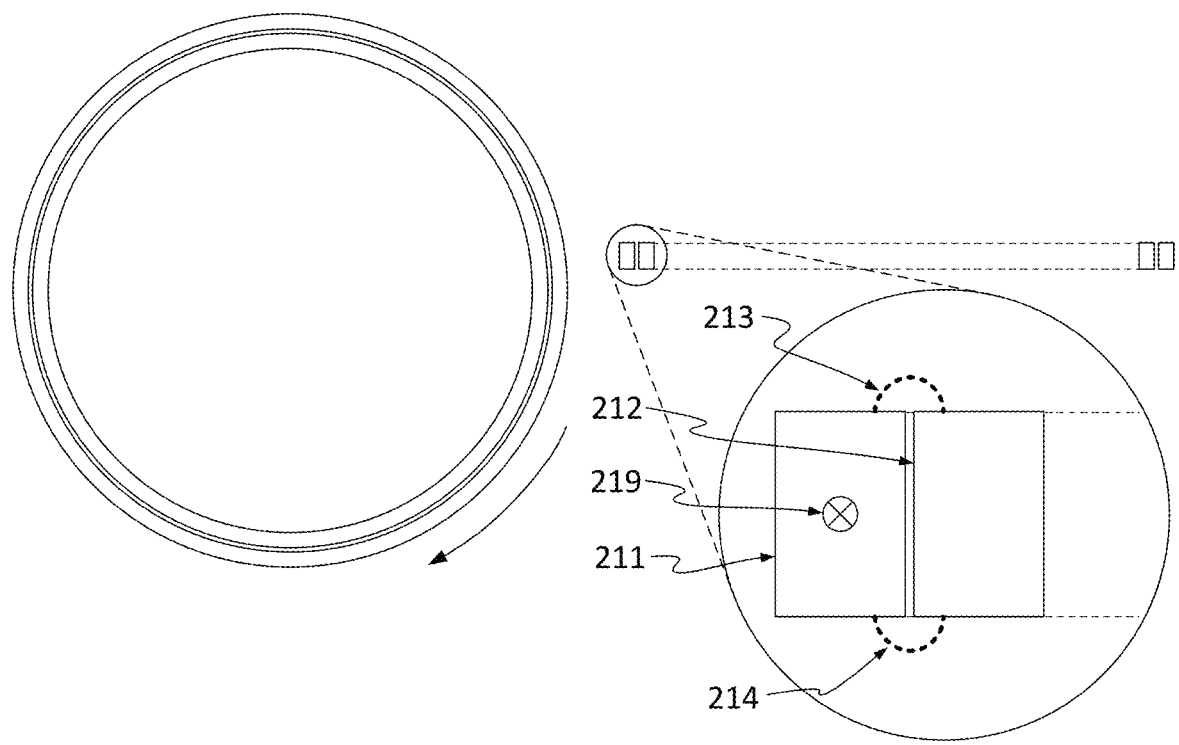

FIG. 8b is a top-view and a side-view of a magnetic bearing of similar dimensions to the ball bearing of FIG. 8a, but much smaller in diameter that the magnetic bearing of FIG. 1, FIG. 2, FIG. 4, and FIG. 5. The inset shows a close-up of the left side of the side-view of the bearing.

DETAILED DESCRIPTION OF THE INVENTION

In FIG. 1, an orthographic projection of the planetary body 101 (The Earth), shows a portion of the southern hemisphere and the continent of Antarctica. The invention comprises at least one bearing 102 deployed around the continent. The detail view of FIG. 1 shows the invention's at least one lift stay 103. In the preferred embodiment, the at least one lift stay 103 is a branched stay so that it can distribute its tensile force across many attachment points at the bearing 102 end, while being thicker and more robust at the end that is anchored to the surface at anchor points located on the protruding side of the planetary body 101. If the planet were defined as having two "sides" relative to the plane of the bearing 102, then the protruding side of the planet is the volumetrically smaller side. In FIG. 1 this is the side that includes the continent of Antarctica.

For the embodiment depicted in FIG. 1, the axis of rotation of the rotating part of the at least one bearing 102 is approximately the same as the axis of rotation of the planet. Other embodiments, where the axis of rotation of the bearing is different from the planet's axis of rotation, are also possible.

In FIG. 2, a cut-a-way view of the southerly latitude of a planetary body 201 is shown as a thick solid line arc, and the edge of space 202 is shown as a dotted line arc to provide a rough sense of the overall scale. If the planet were Earth, then the edge of space 202 may best be defined as the Kármán line. The at least one bearing 203 is represented by a small circle, not drawn to scale. This circle represents a point where the at least one bearing 203 intersects with the plane of the cut-a-way view. To help the reader understand the positional relationship of the entire at least one bearing 203 and the at least one lift stay 204, more of the at least one bearing 203 is shown in faint gray as it fades into the distance, curves around and disappears behind the planetary body 201 and also as it comes into the foreground, and again curves arounds and passes in front of the planetary body 201. These off-the-plane-of-the-figure portions of the at least one bearing are labeled 209. However additional lift stays for supporting these additional portions 209 are not shown, as they would excessively clutter the figure.

FIG. 2 depicts the mechanics for a discrete portion of the invention, where a discrete portion is a portion of reasonably small size. If one were setting up a calculus problem is a cylindrical coordinate space, one would typically use a 'dθ' term (in addition to 'r' and 'z') and then solve by integrating over all values of θ from 0 to 2π. Similarly, a discrete portion represents a portion wherein the use of a dθ term in a mathematical description might be considered reasonable.

The at least one lift stay 204 is shown in the drawing stretching between the at least one bearing 203 and the at least one anchor point 205 on the surface of the planet 201. Note that the at least one lift stay's 204 curvature is approximated in this illustration, and that the at least one anchor point 205 may be an off-shore platform that is itself secured to the bottom of the ocean by cables or other means know in the art of off-shore platform design.

The dotted line arrow 206 represents the force of gravity acting on a unit length segment of the at least one bearing 203 and its supported payload (not shown in FIG. 2). The dotted line arrow 207 represents the inertial force that is generated predominantly by the at least one bearing's at least one rotating ring 211 for a unit length segment of the at least one bearing. Note that the non-rotating parts of the at least one bearing 203 and its payload may technically be moving as well because the planet is rotating and this may contribute slightly to the overall inertial force vector 207. The dotted line arrow 208 represents a tensile force that the at least one lift stay 204 will exert on a unit length segment of the at least one bearing 203. When it is the operator's intent for a unit length segment of the at least one bearing 203 and its payload to remain at a fixed position, these three force vectors 206, 207 and 208 will be adjusted by the operator so that they are substantially in equilibrium. In said equilibrium, the gravity force vector 206 is countered by the inertial force vector 207 and the tensile force vector 208 exerted by the at least one lift stay 204.

It is preferred that an appropriate equilibrium is maintained for all unit length segments of the at least one bearing 203 and that the nature of the equilibrium is continuous and relatively unchanging between adjacent unit length segments. Uniform distribution of the forces exerted by the payload(s) and the at least one lift stay 204 on the at least one bearing 203 is also preferred. It should be apparent to one skilled in the art, that the stronger the construction of the at least one bearing 203 is, the more it will be able to tolerate localized non-uniformity in the distribution of forces acting upon it. Analogously, the stiffness of a suspension bridge allows it to tolerate a certain amount of non-uniform loading as vehicles of differing weight travel across it.

Inside the at least one protective casing 210 of the at least one bearing 203 there is at least one rotating ring 211. At least one non-rotating ring 212 is shown inside the at least one protective casing 210 as well, and the at least one non-rotating ring 212 is attached to the at least one lift stay 204, 215 through the wall of at least one protective casing 210. The at least one protective casing 210 serves to isolate the interior components from matter in the surrounding environment which could generate heat, increase friction, or otherwise interfere with the optimal operation of the interior components.

FIG. 8a and FIG. 8b provide some context and help to explain why the at least one bearing 203 was so named. FIG. 8a shows a standard mechanical ball bearing, albeit one with an unusually large outer diameter to band width ratio. FIG. 8b shows a similarly sized magnetic bearing. As is well known to one skilled in the art of magnetic bearings, the positional relationship between an active magnetic bearing's stator and its rotor are maintained by using sensors, electromagnets, and controllers.

The ball bearing of FIG. 8a would fall apart if its diameter were to be increased several thousand-fold; however, the magnetic bearing of FIG. 8b would not fall apart (if properly designed) because the magnetic coupling technique is less reliant on the structural stiffness of the ring material. A magnetic bearing maintains the positional relationship between its inner and outer rings by dynamically adjusting the forces of it coupling mechanism 213 and 214; therefore, there is no practical upper limit on the diameter of such a magnetic bearing. Because a magnetic bearing does not rely on balls rolling in tracks, its maximum speed and operational life can be designed to greatly exceed that of a ball bearing.

In the preferred embodiment, air is evacuated from within the at least one protective casing 210 so that the moving parts of the at least one bearing 203 will not lose a significant amount of energy due to air friction. Too much lost energy would increase the operational cost of maintaining the at least one rotating ring's 211 speed. It would also increase the cost and complexity of thermal dissipation systems for managing waste heat.

Rings are coupled by a coupling mechanism 213, 214. The coupling mechanism uses, for example, properties of electromagnetism to generate forces of attraction and/or repulsion between the at least one rotating ring 211 and the at least one non-rotating ring 212. These forces are applied to maintain the positions of the rings with respect to one another within the tolerances supported by the coupling mechanism, even while at the at least one rotating ring 211 and the at least one non-rotating ring 212 are in motion relative to one another. In the preferred embodiment the coupling mechanism 213, 214 is designed to impart minimal friction and generate minimal waste heat. This ensures that the operational cost of maintaining the at least one rotating ring's 211 rate of rotation is manageable and the cost and complexity of thermal dissipation systems for managing waste heat is likewise reasonable. In order to minimize magnetically induced friction, the preferred embodiment's at least one rotating ring 211 will be as unvarying as possible from the perspective of the at least one non-rotating ring 212 in the vicinity of the coupling mechanism. Likewise, the preferred embodiment's at least one non-rotating ring 212 will appear to be as unvarying as possible from the perspective of the at least one rotating ring 211 in the vicinity of the coupling mechanism.

To better understand the meaning of "as unvarying as possible", some examples of undesirable variations may be illustrative. If a plurality of individual coupling mechanism components were to be spaced at discrete intervals, such that the magnetic flux density experienced by a ring was stronger near a coupling mechanism component than it was in between adjacent coupling mechanism components, this would represent an undesirable variation. If the coupling mechanism generated a magnetic flux within a ring and the properties or geometry of the ring in the vicinity of the magnetic flux changed periodically due to, for example, the presence of expansion joints, this would be another example of an undesirable variation. While it is seen as advantageous for manufacturing reasons for a ring to be made up of many discrete elements, it is preferred that these discrete elements be designed so that they integrate together seamlessly. If the magnetic field in the vicinity of a non-uniformity were different from the magnetic field elsewhere, then this magnetic field difference would travel rapidly around one ring from the perspective of the other. At any given point, a magnetic field difference that passes by would be perceived as a changing magnetic field. Changing magnetic fields can cause current to flow and this can lead to energy losses. The preferred embodiment will strive to avoid such losses by adhering sufficiently to these mutual uniformity requirements. It should be noted that there are other methods known in the art for avoiding such losses, such as using laminates of conductive paramagnetic material and insulators to minimize the size of eddy current loops. The preferred embodiment would make judicious use of eddy current loop minimizing techniques as well.

Note that it is anticipated that the at least one protective casing 210 and the at least one non-rotating ring 212 could be blended together into a single component that serves the purposes attributed to both components in these teachings. Alternately the at least one non-rotating ring 212 as well as sub-components of the coupling mechanism 213, 214 could be outside the protective casing 210 to make them more accessible and thus easier to service. The use of separate components (that is, the at least one non-rotating ring 212, the protective casing 210, and the coupling mechanism 213, 214) has been chosen to help facilitate the illustration and explanation of technical concepts.

The coupling mechanism 213, 214 is also designed to be able to increase, decrease, and maintain the at least one rotating ring's 211 rate of rotation. Conversion of electrical energy to and from kinetic energy through the use of, for example, electromotive forces, is well known in the art. Electric motors, generators, and linear motors routinely perform such conversions. In the preferred embodiment, the coupling mechanism 213, 214 is able to overcome any forms residual friction (magnetic, air, or other) within the at least one bearing 203 and increase the at least one rotating ring's 211 rate of rotation up to the level required to generate the inertial forces needed for the invention to operate. In the preferred embodiment the coupling mechanism is a single system that serves two purposes: 1) maintaining the ring's 211, 212 positions in relation to one another, and 2) adjusting the rate of ring rotation. However, it is anticipated that these two purposes could also be served by two separate systems (e.g. a coupling system and an electromotive system).

Within the detail view of FIG. 2, the at least one rotating ring 211 and at least one non-rotating ring 212 are depicted as having a slight angle relative to the inertial force vector 207. This angle occurs because gravity acts upon the at least one rotating ring 211. Thus, to keep the rotating ring's path of travel in position, the coupling mechanism must, on average, generate at least one steady force vector that is at an angle with respect to the inertial force vector 207. For the depicted coupling mechanism 213, 214, the at least one force (not shown) is an attractive force. This allows the coupling mechanism to substantially counter both the combined inertial force vector 207 and the gravity force vector 206 acting on the mass of the rotating ring using at least one roughly equal and opposite attractive force. With this slight angle, the need for the coupling mechanism 213, 214 to counter an additional constant shearing forces, relative to each other, is reduced; therefore, the FIG. represents a preferred embodiment where, in the absence of outside disturbances, the steady force would, at least momentarily, be in equilibrium with the other forces.

If the steady force were generated, for example, using only the attractive properties of paramagnetic materials, then Earnshaw's theorem would suggest that the system would not be stable. However, it is well known to one skilled in the art of magnetic levitation or active magnetic bearings that in practice stable magnetic levitation is possible despite Earnshaw's theorem. It is achievable by employing servomechanisms, supportive diamagnetic materials, or superconductors, for example. It is anticipated that within the coupling mechanism 213, 214, there is at least one additional control force that will work in conjunction with the at least one attractive force to maintain the ring positions with respect to one another, within design tolerances, in the presence of reasonable external perturbations and despite any inherent instability associated with the generation of the at least one steady force.

Furthermore, it is anticipated that the bearing would be designed so that the at least one slight angle would be adjustable, using, for example, a system of servos (not shown). At the anticipated scale of a preferred embodiment, the at least one bearing's 203 components will not experience significant mechanical stress if each at least one angle is uniformly adjusted and relatively consistent around the entire bearing. This angular adjustment would permit each of the at least one steady forces to be directed as needed. Adjustment of its direction and magnitude will be needed, for example, when the bearing is raised or lowered, or when the bearing's payload is increased or decreased.

It should be noted that an alternate embodiment is envisioned where the at least one rotating ring 211 and the at least one non-rotating ring 212 are repositioned such that maintaining their relative position requires at least one roughly equal and opposite repulsive force, in addition to various controlling forces. Analogously, some maglev train technologies are known to lift the train using attractive forces and others lift the train using repulsive forces.

In practice, the bearing may be initially constructed and at least partially tested at a first location, and then deployed at a second location. For example, the first location could be on or slightly below the planet's surface or on or slightly below the surface of its hydrosphere. Deploying the bearing to a second location will likely require that it rise up to an operational altitude. By adjusting the force vectors (206, 207, and 208) to be slightly out of equilibrium, a resultant acceleration can be generated. It is preferred that force adjustments be made so that the acceleration is perpendicular to the inertial force vector 207, otherwise the acceleration would cause the bearing's circumference to change. Excessive circumference change could buckle the at least one bearing 203 or generate excessive or unwanted circumferential stress within it.

If, for example, the at least one bearing 203 is initially constructed so that it is centered around and perpendicular to the planet's axis of rotation (this is the case in the depictions of both FIG. 1 and FIG. 2) then the resultant acceleration would preferably be configured to cause the bearing to accelerate slowly along the planet's axis of rotation in the direction that would take it away from the planet's surface. This direction would be towards the bottom of FIG. 2a. In the cylindrical coordinate system defined by 'r', 'θ', and 'z', centered on the planet's axis of rotation, the motion would be along the 'z' axis. Similarly, the forces would be preferably adjusted to make the resultant acceleration act to decelerate the at least one bearing 203 as it nears its operational altitude. The forces can also be manipulated to accelerate the at least one bearing 203 back towards the planet's surface and bring it to a gentle stop as it nears the surface.

The at least one bearing 203, or portions of it, can also be accelerated and decelerated, if needed, to avoid asteroids or space debris that are detected to be on a collision trajectory. In these circumstances, small amounts of bearing circumference change, or changes along the 'r' axis, in addition to changes along the 'Z' axis, may be considered acceptable for the sake of expediency.

There are several ways that forces may be adjusted. The amount of inertial force may be adjusted by changing the rotational speed of the at least one bearing's 203 at least one rotating ring 211. (Note: the symbol 219 indicates that, in this cross-section, the direction of motion of the least one rotating ring 211 is into the page.) The tensile forces exerted by the at least one lift stay 204 may be adjusted by tensioning using a spooling mechanism to winch the stay, by moving the at least one anchor point 205 across the surface of the planet, by adding or removing (if there were previously a plurality of lift stays 204) at least one lift stay 204, and by any other means familiar to one skilled in the art of adjusting tensile forces within cables or fibers. The gravity force vector 206 may be adjusted by adding, removing, or redistributing the mass of, or the mass supported by, the at least one bearing 203. The at least one bearing 203 may exert a circumferential force by tightening or loosening if it is designed to expand or contract, or if it naturally expands or contracts due to weather conditions and seasonally varying amounts of direct heating by sunlight. Methods to achieve expansion or contraction include heating or cooling, mechanically generating compressive or tensile forces using actuators such as pistons, using electromagnetism (including interaction with the planet's magnetic field), a mechanical drive system, bio-engineered muscle, piezoelectric actuators, material expansion due to absorption, or any other technique that is useful for generating tensile or compressive forces that is familiar to one skilled in the art of generating forces within materials, machines, or structures. The circumferential force is not shown as it is considered to be a small force on a planetary scale implementation of the invention, however it may be a relevant and useful force in a smaller scale implementation of the invention, such as a prototype implementation.

The at least one bearing 203 and the plurality of lift stays 204 may incorporate navigational aids, such as lights, radio transponders, and tracking systems to assist with guiding ships and air traffic in the vicinity.

FIG. 3 is a flowchart that describes a process of constructing and erecting the preferred embodiment.

For the preferred embodiment, construction begins with the fabrication of parts on the planet. Then the parts will be loaded onto ships, assembled, and deployed such that they are just under the surface of the ocean, such that the completed bearing encircles Antarctica. The ability to initially deploy the structure in the ocean is advantageous because it potentially reduces property acquisition, right-of-way, and environmental challenges. There are also fewer natural and manmade obstacles in the ocean than on land. This is a major reason for proposing a southerly location for the preferred embodiment. It is also advantageous for the bearing to maintain a stationary position over the Earth without experiencing gyroscopic forces associated with the Earth's rotation, so in the preferred embodiment the structure is positioned such that the at least one rotating ring's axis of rotation is substantially parallel to the planet's axis of rotation. A design wherein the bearing's approximate center is offset with respect to the planet's axis of rotation is also anticipated. Such a design affords the invention the ability to support facilities at a variety of different altitudes. For example, the altitudes optimal for tourism facilities may be different from the altitudes that are optimal for facilities that launch payloads into space. Note that the at least one bearing 203 does not have to be a perfect circle as at the scale of the invention the at least one bearing 203 would be somewhat flexible.

The construction depth in the ocean may be selected to be low enough to avoid ships and icebergs, but not so deep that the engineering cost of withstanding water pressure and operations costs of working at the selected depth is too high. Technology and equipment that today are used to lay large undersea oil pipelines may be repurposed for this phase of the project.

FIG. 4, not to scale, depicts an earlier phase of construction. During this phase, the bearing is enclosed within an encasement system 401 so that it would be protected from the ocean and yet still accessible for inspection and outfitting purposes. While safely underwater, the at least one moving bearing 411 and the coupling mechanisms 413, 414 could be tested within their protective casing 410 at gradually greater and greater speeds until sufficient margins of safety at operational speeds have been established. In the event of catastrophic failure during underwater testing, the surrounding ocean would decelerate fast moving fragments so they would not be ejected from the vicinity of the construction site at high speeds. The partial vacuum of near space could be recreated inside the encasement system 401 so that testing conditions would be as realistic as possible. Testing could include, for example, firing projectiles from a high energy cannon (not shown) at various components to establish the design's resilience to micro-meter impact, and the ability of various automated repair systems (not shown) to work quickly and reliably to make repairs in a near-vacuum environment.

The vacuum containment system, instrumentation, emergency backup systems, automated repair systems, etc. could all be verified during this phase of construction.

To prevent the inertial forces from stretching the bearing during testing, at least one temporary construction stay 404 & 405 would be attached between the outer shell of the encasement system 401 and at least one temporary construction stay anchor point on the planet's lithosphere 406. The buoyancy of the encasement system 401 and the anchoring effect of the at least one temporary construction stay 404 & 405 must be designed to work together to prevent the bearing from drifting around during construction and testing. To provide additional stability, actuators 402 will actively maintain the position of the bearing 410 relative to the planet within required tolerances, so long as the position of the encasement system 401 relative to the planet is stable within somewhat looser tolerances. It is anticipated that at least one thruster nacelle (not shown) affixed to the exterior of the encasement system may be employed to assist with positioning efforts and/or to serve as a backup stability system.

FIG. 5, not to scale, depicts a later phase of construction. After initial testing has completed, the process of deploying the at least one bearing 510 to its operational altitude can begin. Shipping and icebergs will need to be directed away from the encasement system 501 for this phase. The at least one temporary construction stay 504 & 505 could be loosened to allow the encasement system 501 to float to the surface. The at least one lift stay 515 will be affixed to the at least on bearing 510. The at least one bearing's 510 at least one rotating ring 511 will be accelerated to an operational rotational speed. The inertial force vector 207 of the bearing 203 would combine with the tensile force vector 208 provided by the at least one lift stay 204 and the gravity force vector 206 acting on the bearing 510. (Note that referring to the forces depicted in FIG. 2 is somewhat misleading in this context as FIG. 2 shows the invention in an already deployed state.) The rotational rate (and thus inertial force) would be adjusted, and the at least one lift stay 515 would be tensioned, so as produce resultant acceleration of the at least one bearing 510 parallel to the planetary body's axis of rotation, and away from the planet. However, the resultant acceleration will not yet move the bearing 510 away from the planet's surface as it is still held in position by the anchored encasement system 501. As mentioned earlier, it is preferred that the resultant acceleration should be parallel to the planet's axis of rotation to prevent hoop stresses (not shown) that would cause the bearing's circumference to increase or decrease.

The top of the encasement system 501 could be removed and the telescoping actuators 502 could position the bearing sufficiently clear of the surface to allow facilities and other systems to be added. During the outfitting phase, the load on the bearing should be evenly distributed at a fairly constant level.

With outfitting completed, the bearing would be released from the telescoping actuators 502 and raised to higher altitudes by maintaining the right balance of inertial and tensile forces while gradually unwinding the at least one lift stay 515 from at least one spool mounted on an ocean going vessel while simultaneously moving the at least one spool on the vessel towards the planet's pole, and away from the bearing. In the preferred embodiment, the at least one lift stay 515 will always be either safely wrapped around the at least one spool or it will be under tension and in use to help support the bearing. It would not be desirable for a lift stay 515 to rest on the ground or float in the ocean at any point during construction.

From the point of view of someone on one of the ocean-going vessels, this phase of the process would be somewhat analogous to a child launching a kite. Typically, the kite's string starts out mostly wound on a spool, and is gradually unwound as the kite gains altitude. Often the child will move backwards away from the kite as he/she unwinds the string. In the case of the preferred embodiment, the inertial forces generated within the at least one bearing 510 are analogous to the wind force that serves to tension the kite's string, the ocean-going vessel is analogous to the child, and the at least one lift stay 515 is analogous to the kite's string. In the preferred embodiment there are, of course, a plurality of lift stays 515 and ocean-going vessels operating in a precisely coordinated manner using advanced navigational aids to accomplish the goal of raising the bearing to its operation altitude.

FIG. 7 shows how the deployed bearing 702 and lift stays 703 may appear to an observer who is orbiting the planet 701.

Referring back to FIG. 2, when the bearing has been raised to its operational altitude, the anchor end of the at least one lift stay 204 can be transferred from the ocean-going vessel to an anchor 205. The at least one anchor relative to the planetary body 205 in the preferred embodiment would also have the ability to adjust the tension of the lift stay 204, and it would be designed to withstand and/or repel terrestrial threats, including storms, tsunamis, weapons typically available to terrorists, collisions with ocean vessels and aircraft, etc. The at least one anchor 205 could also be a tall structure. This would add some additional altitude to the overall invention and help ensure that the low end of the at least one lift stay 204 was more difficult to reach and thus damage from the surface of the planet. For example, if the anchor 205 was a 500 m tall structure, and the at least one lift stay 204 were attached to the top of it, then it would be more difficult for a terrorist in a boat to strike the lift stay 204 using, for example, a Rocket Propelled Grenade (RPG).

It is also preferable for the at least one anchor 205 to be repositionable, ideally under its own power. This capability would be needed, for example, in the event that an ice sheet was to break away from the planet's ice cap and drift towards the at least one anchor 205. The anchor could then be repositioned to be out of the path of the drifting ice sheet while simultaneously maintaining tension on the at least one lift stay 204. If a very large ice sheet remained intact while being on a collision course with at least one anchor 205 (as opposed to breaking apart naturally) then it might become necessary to accelerate the ice sheet's break up using explosives. This would enable the at least one anchor 205 to travel in and around smaller ice sheet fragments. It might also be necessary to temporarily lower the operational altitude of the at least one bearing 203 to increase engineering safety margins during these operations.

FIG. 6 shows a section of the at least one bearing 600 supporting at least one payload winching system facility 601 and at least one domicile facility 602, 603 via at least one tie 604. At least one transportation system facility provides a means of accelerating at least one vehicle 607 along at least one track 605 that is, for example, supported by at least one arm 606 attached to at least one payload winching system facility 601 or at least one domicile facility 602, 603. Stops may be made at various facilities to load or offload passengers and cargo through at least one doorway 611, 612. Note that the at least one payload winching system facility 601, the at least one domicile facility 602, 603, and the at least one vehicle 607 preferably incorporate some habitable enclosures. The at least one doorway 611, 612 is preferably a pressure sealed doorway that provides access to habitable enclosures. The at least one transportation system may alternately be attached directly to the at least one bearing 600 or to at least one of the at least one lift stays (not shown in FIG. 6).

The at least one transportation system may optionally be fully or partially enclosed within a tube (not shown). A fully enclosed tube may be a sealed tube and the environment within that tube may differ from the environment outside. For example, the environment within may be more evacuated to further reduce air friction, or it may be less evacuated so that it can sustain human life in case a vehicle's pressure containment system fails. A partially enclosed tube may serve to attenuate the sound of passing vehicles so as not to disturb residents of the at least one facility.

The at least one transportation system (or at least one transportation system specially purposed for space vehicle launch and recovery) may accelerate the at least one vehicle 607 to a suitable orbital or space travel speed at which point a mechanism for releasing vehicles 608 and 609 is activated to release the at least one vehicle 607. A similar launch and recovery facility could be used to accelerate a recovery vehicle (the recovery vehicle would not detach from the track) up to a speed that would enable it to rendezvous with a space vehicle that was returning to the planet from space. The space vehicle could maneuver so that it would momentarily match its velocity and position with the moving recovery vehicle, such that it could be retrieved, using at least one grappler (not shown), by the recovery vehicle. Once linked, the recovery vehicle could decelerate the space vehicle so that passengers and cargo could exit the space vehicle and enter one of the supported facilities. Alternately, passengers and cargo could simply enter the recovery vehicle through an airlock. In this way the space vehicle, its cargo, and its passengers would be spared the hardship and perils of returning to the planet's surface using aero-braking techniques. It would also be less costly to refurbish the space vehicle and return it to service, relative to other vehicles that are designed to travel to and from the surface of a planet with an atmosphere, such as The Space Shuttle system developed by NASA.

Passengers and cargo may travel between the surface and the at least one bearing 600 via at least one cable 610. A facility that supports a form of transport that uses at least one cable 610 is referred to as a payload winching system 601.

Note that FIG. 6 is a greatly simplified depiction of the bearing 600 supporting various facilities and domiciles as well as an inter-facility transportation system. The inventor anticipates that in practice the transportation system would comprise sufficient tracks to provide service in both directions and to allow individual vehicles to accelerate and decelerate so that they can travel while merged into a stream of vehicular traffic.

With respect to the payload winching system 601, it should be pointed out that one skilled in the art of moving passengers or cargo vertically knows that any of a number of different techniques may be employed. For example, a cable can be spooled on a powered drum, a cable can wind around a powered drum and then connect to a counter-weight, a cable can loop around a powered drum at one end and a pulley at the other, and a cable can be stationary but the car can grip the cable in a manner that allows it to climb the cable.

In the preferred embodiment, the stationary cable technique is used with at least two cables. The cable is a tapered cable made from an available material of high specific strength, such as carbon fiber. The car is equipped with a mechanism that allows it to grip the cable and climb it rapidly without causing the cable to experience wear at an unacceptable rate. Stabilizers positioned at points along the length of the cable serve to keep the cable at a stationary position in the presence of wind using aeronautical techniques. Stabilizers are designed so that they will not obstruct the passage of an elevator car. For example, a stabilizer can be long and it can attach to the cable at multiple points. This way individual attachment points can temporarily detach one at a time to allow the car to pass by unimpeded.

The stabilizers draw AC electrical power inductively from insulated wires within the cable. Within each cable embedded insulated wires of finite length overlap with one another to generate inter-wire capacitance. This capacitance allows the individual wires to AC couple, which allows an AC current to travel along the entire length of the cable, while simultaneously preventing a significant DC current from travelling further than the finite length of one of the individual embedded wires. This prevents the cable from becoming a path-of-least-resistance for built up charges in the atmosphere to discharge through.

To reduce the amount of power loss through electromagnetic radiation, the at least two cables form a differential pair and the AC current in one is made to be always equal and opposite to the AC current in the other. If more than two cables are used, then a multi-phase AC current can be transmitted that is designed to achieve the same minimal aggregate AC current effect. The stabilizers separate the cables and inductively couple with each cable individually to draw power.

The car itself will be equipped with stabilizing technology such as gyroscopes and thrust systems so that passengers will experience a smooth ride even on windy days. It also draws power inductively from the embedded wires within the cables like the stabilizers do.

The planetary body 101 may be any moon, planet, or celestial object that the invention is anchored to.

A bearing may be comprised of more than two rings and the rings may all have different rotational rates. A bearing comprised of many nested rings where the rates vary incrementally from ring to adjacent ring is covered by this invention and is seen as a design variant that potentially allows for maximum speed differential between an outermost and innermost ring while there is a smaller speed differential between any two adjacent rings. This may be an advantageous variant for maintenance or friction reduction purposes.

It is anticipated that embodiments of the invention may, in practice, comprise more than one bearing to provide redundancy in case of failure and so that individual bearings can be taken out of service occasionally for maintenance and repair.

A typical ball bearing relies on the mechanical rigidity of its rings to create a track that balls or rollers can roll in. As the at least one bearing 203 in the claimed apparatus is large, mechanical rigidity of its rings is not sufficient to maintain their positional relationship with respect to one another. The bearings rings are therefore held together by other means. The preferred means is to use a coupling mechanism 213, 214 which employs electrically controlled magnetic forces to maintain the spacing of the rings with respect to one another. A plurality of sensors will measure the spacing between adjacent rings and feed their measurements into a control function. The control function will adjust the magnetic forces in response to the measurements in order to maintain the desired spacing. It is preferred that the target spacing between rings 211, 212 of the at least one bearing 203 be at a distance where the magnetic fields generated by permanent magnets will provide exactly the right amount of force to counter the differences in centripetal forces between two rings 211, 212. Electrically generated alterations of the magnetic force would then only be needed for control purposes to make corrections if portions of the rings at least one 211, 212 drift from the optimal position relative to one another.

The preferred embodiment's at least one coupling mechanism 213, 214 uses at least one first force that does not consume power and at least one second force that does consume power and is under the control of a controller. The first force is the attractive or repulsive forces of permanent magnets, as described in the preferred embodiment. It is anticipated that forces may be generated by other means, such as by having charged particles traverse perpendicular to a magnetic field (Lorenz forces), electrostatic forces, or using the magnetic flux pinning properties of Type II superconductors. The second force can be electrically generated magnetic fields, as described in the preferred embodiment, or a mechanical force (hydraulics, pneumatics, motor, piezoelectric device, or any other means known in the art of mechanical actuation), or the adjustment of a charge across two-plates separated by a distance or any other means known in the art for generating a controllable force. In the case of a mechanically actuated second force, the second force could control the position of at least one permanent magnet, for example, as a means of controlling or maintaining the magnitude of the first force.

The at least one anchor 205 may be similar to an anchor used for the cables of a suspension bridge. It could be connected directly to solid ground, such as bedrock. However, it is also feasible to connect them to the planetary body through machines that generate thrust by displacing the matter (e.g. in the hydrosphere or atmosphere) of the planetary body. For example, an anchor could be a ship that uses the thrust of its propellers to maintain its position in the ocean and exert the correct amount of thrust on the anchored end of the at least one lift stay 204, or an aircraft that uses the thrust of its engines in the atmosphere to exert a correct amount and direction of force on the anchored end of the at least one lift stay 204.

The at least one lift stay 204 could be a single cable; however, in the preferred embodiment the lift stay 204 is designed so that it forks repeatedly so that there are fewer anchor points near the planet's surface relative to the number of attachment points at the at least one bearing 203. Fanning-out a lift stay in this manner enables one lift stay's arrays of attachment points to be overlapped with the attachment points of an adjacent lift stay. This can provide redundancy in case of individual lift stay failure. Fanning out also generates more evenly distributed support at the bearing so that the bearing's protective casing 210 would not need as much mechanical stiffness. At the other end of the lift stay 204, the fan-in leads to fewer obstructions and anchor points at the lower altitudes. This makes it easier for air and sea traffic on routes near Antarctica to navigate around the plurality of lift stays and anchors. It enables the lift stays to be thicker and stronger at the lower altitudes, where they are more exposed to terrestrial threats.

Individual lift stays may be angled so that they overlap in a crisscross fashion or are interwoven in some manner. This would serve to provide rotational stability to the at least one bearing 203. It is anticipated that the techniques of generative design could be used to explore numerous possible permutations, given a set of design goals, to develop an optimized configuration for the plurality of lift stays. It is not unusual for such design methodologies to produce results that look almost organic in their construction. It is anticipated that a plurality of lift stays 204 may be implemented as a regular or irregular web or mesh of interconnected fibers.

The tensile force exerted by the plurality of lift stays 204, when combined with the inertial force of the at least one bearing 203, counters the force of gravity. When the plurality of lift stays 204 droops or sags less, more of its tensile force 208 contributes to countering the force of gravity 206, and less inertial force 207 is needed to keep the three force vectors 206, 207, 208 in substantial equilibrium. Sag can be minimized if the lift stay is very light in relation to its strength, and that can be achieved by using high specific strength materials in its construction. In the preferred embodiment, lift stays are engineered to take advantage of both high specific strength materials, such as carbon fiber, and also utilize the atmosphere for additional support. This will maximize the gravity countering upward component of their force vector at the point where they attach to the bearing.

Lift stay weight is affected by application of corrosion resistant coatings, acoustic monitoring systems, and energy supply systems for automated repair and maintenance machinery. Techniques such as acoustic monitoring (essentially listening for snapping sounds with microphones positioned along the length of the lift stay) are used to determine the location and frequency of breaks that may occur in the individual strands of lift stay.

Our aeronautical industry has become very adept at reliably keeping all manner of aircraft aloft in the skies above us. For example, the U-2 reconnaissance aircraft, build in the 1950's, operates at an altitude of 70,000 ft, or 21 km above sea level. It seems inevitable, therefore, that more optimal lift stay designs will incorporate the science of airflow—and that considerable aeronautical engineering expertise will be brought to bear on the problem of how to make maximum use of it. Another relatively recent advance in the aeronautics industry is in the field of automated aircraft, or "drones". The use of a fleet of drone aircraft 216 to shepherd the lift stays is seen as advantageous because the drones can detach and return to base stations for maintenance or to other facilities where they will be continually recycled and replaced. While attached, for example by a short tether 217, to the lift stays they can draw power or fuel from a lift stay borne power supply system as opposed to running on their own internal power reserves.

As the winds and temperatures in the atmosphere vary, and as the bearing and its lift stays cover vast distances, the means of advantageously incorporating airflow into the design must be adaptable. For example, if the wind conditions favor it, inflatable compartments 218 within the lift stays can be inflated with hot air or hydrogen, so that they become light enough to be buoyed by the atmosphere. If the wind is travelling along the lift stay, the lift stay could deploy airfoils into the airflow to generate lift. If the wind is travelling across the lift stay, the lift stay can be deflated and flattened into an airfoil itself. Propulsion on the leading edge of the lift stay could pull the lift stay through the wind, both keeping it straight and generating upward lift preventing the lift stay from sagging under its own weight. Energy is needed to heat air, inflate or deflate sections of the lift stay, or power propulsion systems, such as the aforementioned attached drone aircraft.

Two methods are used in the preferred embodiment for delivering this energy: 1) deliver it electrically, and 2) deliver it by manufacturing hydrogen and pumping that up the interior of the lift stay. It should be noted that there are many methods of delivering energy that are well known in the art. Either or both of the preferred methods may be considered depending on the aeronautical engineering associated with the lift stay design at a given altitude. Hydrogen plumbing might be lighter than electrical wiring and potentially hydrogen fuel could more directly and efficiently fuel air heaters and engines. Reserves of hydrogen stored inside the lift stay may have significantly better energy density properties for this application than batteries. Thus, a hydrogen-based design may be more resilient to interruptions in energy supply.

Hydrogen can also be readily converted to electricity using fuel cells; however, the proponents of an electric design would no doubt point out that an electrically powered design would be less flammable. Electric systems would probably operate more reliably at higher altitudes where oxygen is scarce. The best solution depends on factors that vary along the length of the lift stay. For example, at extremely high altitudes the buoyancy of electrically heated hydrogen is recommended and likely the most optimal solution. At lower altitudes, electricity is recommended for powering propellers that generate thrust.

While hydrogen will inevitably leak out through the walls of any container, if the leaking hydrogen can be reacted with oxygen using a catalyst to generate useful heat energy for increasing buoyancy, then non-permeable containment of the gas does not need to become a requirement. Heat energy can be used to generate more buoyancy from the hydrogen and to prevent ice from building up on the lift stays, and to prevent the materials from becoming fragile and cracking if exposed to extreme cold.

If support of lift stays were lost, then the bearing would start to fall back towards the planetary body. If a risk analysis deemed it necessary, then the bearing could be equipped with a safety system, such as parachutes (if the lift stays themselves are insufficient), retro-rockets, air bags, or some other means, to lower its terminal velocity and cushion its impact with the ocean.

Winching is the action of moving cargo away from the surface of a planetary body and towards the bearing and moving cargo away from the ring towards the surface of a planetary body.

Cargo includes vehicles or containers containing provisions, equipment, supplies, materials, people, biologics, goods, waste or anything else that needs to be transported.

The preferred embodiment for the system for accelerating vehicles is a maglev system. Maglev systems are well known in the art and maglev technology is currently used in some modern transportation systems on Earth.

The preferred embodiment for the system that releases vehicles is at least one electromagnet coupled to a ferromagnetic plate that would be turned off in order to release the vehicle. The magnet could have a mechanical grappler as a back-up system or for parking purposes when the vehicle needs to be fully powered down.

A habitable compartment comprises systems that support some human necessities such as breathing adequately pressurized air, drinking water, temperature control, and as a means to enter and exit the compartment. The cabin of an airplane is an example of a habitable compartment.

The invention claimed is:

1. An apparatus for elevating at least one facility above the surface of a planetary body, wherein the apparatus comprises at least one bearing where the circumference of said at least one bearing is smaller than the circumference of said planetary body and yet large enough to completely encircle a portion of said planetary body, and a plurality of lift stays connected between said at least one bearing and at least one anchor point positioned on a protruding side of said planetary body, where: a. for at least one discrete portion of the at least one bearing, a tensile force vector generated by at least one lift stay combines through a coupling mechanism with an inertial force vector produced by at least one rotating ring to generate a resultant force vector that acts in opposition to the downward force of gravity,
b. for said at least one discrete portion of the at least one bearing, neither said tensile force vector nor said inertial force vector on their own act in direct opposition to the downward force of gravity.

2. The apparatus of claim 1 where the at least one bearing uses the at least one coupling mechanism that utilizes magnetic forces to maintain a positional relationship between the at least one rotating ring and at least one non-rotating ring.

3. The apparatus of claim 2 where the at least one bearing uses at least one electromotive system to increase or decrease the rotational rate of the at least one rotating ring.

4. The apparatus of claim 2 where the at least one rotating ring is inside at least one protective casing.

5. The apparatus of claim 4 where a vacuum is maintained within the at least one protective casing.

6. The apparatus of claim 2 where the at least one rotating ring is engineered to have an unvarying effect on magnetic flux from the perspective of the at least one non-rotating ring in the vicinity of non-electromotive parts of the coupling mechanism.

7. The apparatus of claim 2 where the at least one non-rotating ring is engineered to have an unvarying effect on magnetic flux from the perspective of the at least one rotating ring in the vicinity of non-electromotive parts of the coupling mechanism.

8. The apparatus of claim 1 where no part of the bearing rests upon or within the hydrosphere or lithosphere of a planetary body or is otherwise supported via transference of compressive forces through a strut, tower, or other supporting structure that is in turn supported by the hydrosphere or lithosphere of said planetary body.

9. The apparatus of claim 1 where the at least one facility is a facility for transporting vehicles containing passengers or payloads around the circumference of the bearing to and from various other facilities.

10. The apparatus of claim 1 where the at least one facility is a launch facility for accelerating at least one vehicle along the at least one bearing and where said facility is configured to release said vehicle from said facility to enable said vehicle to reach its final destination using less propellant than would be needed relative to launching said vehicle from the surface of the planetary body.

11. The apparatus of claim 1 where the apparatus comprises at least one payload winching system.

12. The apparatus of claim 1 where the apparatus is configured to elevate at least one permanent and habitable facility.

13. The apparatus of claim 1 where the at least one lift stay is a forked lift stay.

14. The apparatus of claim 1 where at least one of a plurality of compartments within or attached to at least one of the plurality of lift stays may be:
a. inflated with a lighter than air gas so that said lift stay's droop can be reduced using the buoyancy of said lighter than air gas when low wind speeds permit the lift stay to have a larger cross-section, and
b. deflated when having a smaller cross-section to the wind is preferable because it will make it easier to keep the lift stay on station.

15. The apparatus of claim 1 where the cross-sectional shape of at least a portion of at least one of the plurality of lift stays is re-configurable to optimize the flow of air passing by said lift stay due to wind.

16. The apparatus of claim 1 where a plurality of drone aircraft serves to maintain the position of at least one of the plurality of lift stays and where the drone aircraft can draw power from at least one of the plurality of lift stays.

17. The apparatus of claim 1 where at least one of the plurality of lift stays is connected to at least one anchor that is repositionable.

* * * * *